Sept. 15, 1964  J. R. GIER, JR  3,148,442
METHOD OF MAKING A PIN FIN ASSEMBLY WITH
BONDED CROSS TIE MEMBERS
Filed Feb. 12, 1960  3 Sheets-Sheet 1

INVENTOR.
JOHN R. GIER, JR.
BY
ATTORNEY.

Sept. 15, 1964  J. R. GIER, JR  3,148,442
METHOD OF MAKING A PIN FIN ASSEMBLY WITH
BONDED CROSS TIE MEMBERS
Filed Feb. 12, 1960  3 Sheets-Sheet 2
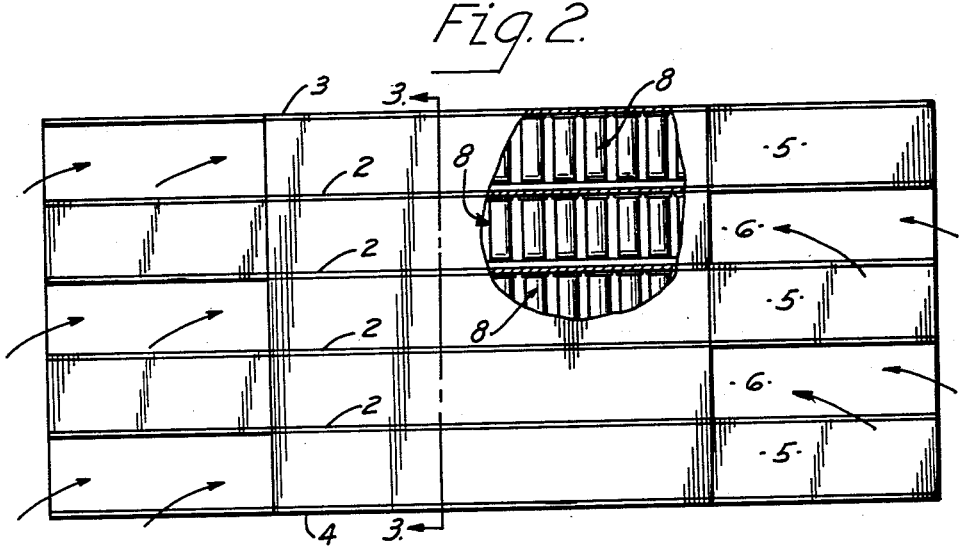
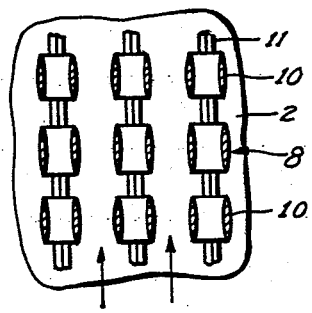
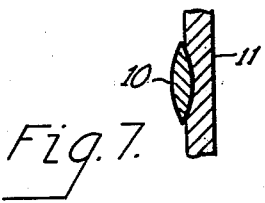
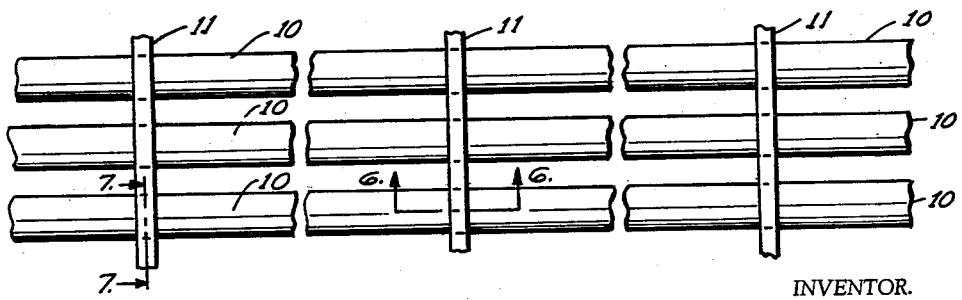
INVENTOR.
JOHN R. GIER, JR.
BY
ATTORNEY.

Sept. 15, 1964  
J. R. GIER, JR  
3,148,442  
METHOD OF MAKING A PIN FIN ASSEMBLY WITH  
BONDED CROSS TIE MEMBERS  
Filed Feb. 12, 1960  
3 Sheets-Sheet 3
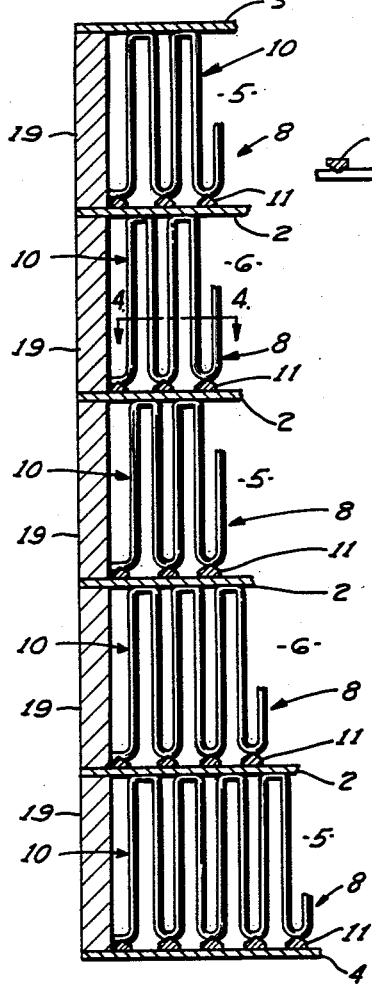
Fig. 3.
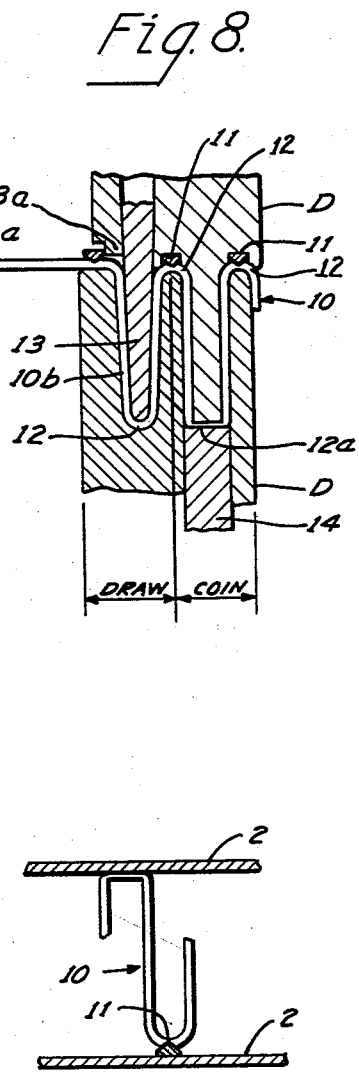
Fig. 8.
Fig. 9.
INVENTOR.  
JOHN R. GIER, JR.  
BY  
his ATTORNEY.

United States Patent Office 3,148,442
Patented Sept. 15, 1964

3,148,442
METHOD OF MAKING A PIN FIN ASSEMBLY
WITH BONDED CROSS TIE MEMBERS
John R. Gier, Jr., Hines Hill Road, Hudson, Ohio
Filed Feb. 12, 1960, Ser. No. 8,378
2 Claims. (Cl. 29—157.3)

This invention relates to a heat exchanger and pin fin assemblages therefor, and particularly to a method of making the pin fin assemblage and exchanger.

The present type of heat exchanger is adapted for structures such as preheaters for fuel fired boilers wherein ash, carbon, and like foreign matter must be contended with, necessitating an extremely rugged structure with large flow passages.

The exchange is a specialized form of the type of heat exchanger disclosed in my United States Letters Patent No. 2,678,808, issued May 18, 1954, and is made by a method constituting a modification of the method disclosed in my United States Letters Patent No. 2,778,385, issued January 22, 1957.

The exchanger is one of the general type in which a myriad of rows of pins, with connecting ligaments between the individual pins of the row, are arranged so that the pins are disposed in parallel and laterally spaced relation to each other between parallel and flatwise spaced confining plates with their axes normal to the plate faces and with the pin ends and ligaments brazed to the confining plates.

One of the principal objects of the invention is to provide a rugged pin fin assemblage or mat of this general type which can be held to proper dimensional accuracy between its opposite faces so that its faces can be brazed effectively to its confining plates or walls, can be handled readily during manufacture and assemblage in a heat exchanger, yet can flex slightly flatwise about axes extending both lengthwise and crosswise of the mat so as to accommodate itself to irregularities in the faces of the confining plates for facilitating brazing and the obtaining of uniformity and can be formed on commonly available fence wire fabricating machines and conventional presses with simple dies and tooling.

Another object is to provide a simple method of making such a pin fin assemblage wherein large numbers of pins are formed concurrently.

Another important object is to provide a pin fin assemblage and heat exchanger in which a mat of pin fins is arranged so that the pins have effective permanent thermal bonds, free from thermal constrictions, with the confining plates between which the mat is disposed, and with each area of contact between the mat and each plate for each pin being at least equal to, or greater than, twice the cross sectional area of the associated pin.

Another object is to arrange the pin fin mat so that it offers a minimum aerodynamic form drag and useless turbulence.

Another object of the invention is to provide a structure of this character which is particularly adapted for the formation of mats of pins of lenticular or streamlined cross section.

Various other objects and advantages of the invention will become apparent from the following description wherein reference is made to the drawings, in which:

FIG. 2 is a front elevation of the heat exchanger illustrated in FIG. 1, the inlet headers being removed and part of the outer casing being broken away to disclose the internal structure, for clearness in illustration;

FIG. 3 is an enlarged fragmentary vertical sectional view taken on the line 3—3 in FIGS. 1 and 2;

FIG. 4 is a fragmentary horizontal sectional view taken on the line 4—4 in FIG. 3;

FIG. 5 is a horizontal plan view of a preliminary assembly of metal pin members, each of which is to be formed into series of alternate pins and connecting ligaments, and metal cross tie members, illustrating the first step in the method of forming the pin fin mat;

Figure 1:
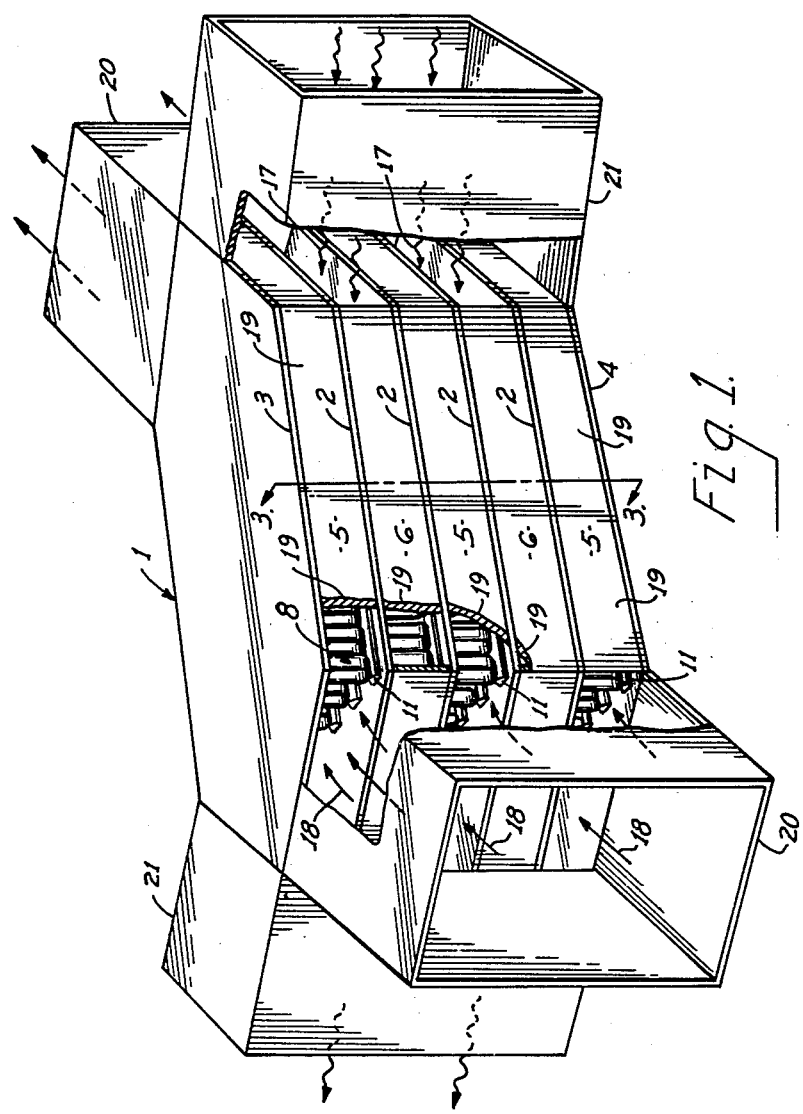
FIG. 1 is a perspective view of a heat exchanger incorporating a pin fin mat which embodies the principles of the present invention.

FIGS. 6 and 7 are fragmentary vertical sectional views taken on the lines 6—6 and 7—7, respectively, in FIG. 5;

FIG. 8 is a diagrammatic illustration showing the manner of drawing the assembled group pin forming members into a pin fin mat; and FIG. 9 is an enlarged diagrammatic fragmentary vertical sectional view illustrating the bonding of the opposite crests of a pin forming member to the enclosing plates of the heat exchanger.

Referring to the drawings, the invention is shown as embodied in a heat exchanger of the general type above mentioned, and is indicated generally at 1. The exchanger comprises a plurality of sheet metal partition walls or confining plates 2 which are spaced apart from each other flatwise in parallel relation so as to provide therebetween a plurality of fluid conducting spaces. The heat exchanger has a top wall 3 and a bottom wall 4, both of which are sheet metal confining walls and which are parallel to the walls 2. The resultant spaces between adjacent walls 2, and between the top and bottom walls and the wall 2 adjacent to them, provide passages for the fluids, respectively, arranged so that those of the passages which receive fluid at a given temperature and pressure alternate with those passages which receive another fluid at a different temperature and pressure.

For convenience in description, alternate ones of the passages, beginning with the topmost passage, are considered low pressure passages 5 and the passages therebetween are considered high pressure passages 6, it being understood that the passage 5 may be high pressure and the passage 6 low pressure, if desired. All of these passages 5 and 6 accommodate extended surfaces in the form of pin fin mats with which the present invention is particularly concerned.

In the form illustrated, all of the extended surfaces are made in the same manner, each comprises a mat of pin fins, indicated generally at 8.

At this point, it should be noted that heretofore it has been proposed that pin fin mats of this general type be made by forming relatively heavy wires into sinusoidal shape, with rounded crests, individually and then locating and bonding them in some manner between the confining plates. One prior suggestion in this regard is to form each individual pin forming wire separately into sinusoidal shape and, after this formation, to assemble the wires in parallel, laterally spaced relation to each other with the crests of adjacent pin forming members at each face of the resultant mat, aligned with each other in a direction transversely of the pin forming members, and bond heavy metal cross tie strips or bars to certain rows of the aligned crests at each face of the mat to hold the wires in assembled condition.

However, certain difficulties would be encountered in this connection in the case of heavy wires of 3/32 of an inch in diameter and up. In the first place, it would be very difficult to form each of the individual wires separately into sinusoidal shape, to hold them in assembled position, and, while so holding them, to weld the cross tie bars or strip members to their crests, and obtain in the finished mat dimensional accuracy in a direction normal to the planes of the faces of the mat so that the mat can fit between parallel surfaces. This is because the heat used for welding or brazing the cross tie bars to the wires would relieve internal stresses imposed in the preceding bending operation, would cause unequal heating of the as yet unconnected pin forming wires, and cause uncontrollable warping and distortion of the individual wires and cross tie members.

Again, it would be very difficult, while maintaining the sinusoidal wires in position, to weld the cross tie members to their rounded crests in a manner such that adequate area of contact would be provided to eliminate thermal constrictions at the junctures of the tie members or bars and the sinusoidal wires.

These prior proposals were to the effect that the cross tie bars should be bonded to crests at both faces of the mat, and since the bars were large in cross section relative to the wires, the cross tie bars and joining sinusoidal wires would provide, in effect, relatively heavy spaced webs with lacing rods tying them together to form an extremely rigid beam structure which would constrain the mat from flexure flatwise.

These objections are eliminated in the present invention by forming the mats and bonding them to the plates in a manner hereinafter described.

Referring to FIGS. 5 through 11, the pin forming members 10, shown in FIG. 5 as straight wires or rods, each of which is to be bent subsequently to form a series of pins 10 and connecting ligaments, are positioned in laterally spaced parallel relation to each other and cross tie bars 11 are then laid on the upper surface of the group in spaced parallel relation to each other and are bonded thereto by welding.

The heat and welding pressure are such as to embed the cross tie bars 11 partially into the wires 10, as best illustrated in FIG. 6, to create bonded areas of resultant contact between each cross tie bar 11 and its intersections with each wire 10, each of which areas is preferably about two times the cross sectional area of a wire 10. This eliminates thermal constrictions which would be caused by inadequate areas of contact between the wires 10 and cross bar 11 and by any inadequate cross section of the metal of the pins or tie bars.

The wires 10 with the tie bars 11 form a unitary grid assemblage which is then formed into a mat by the method illustrated in FIG. 8. As there illustrated, the the wires 10 are formed as a group by a drawing operation, the group being fed lengthwise of the wires 10 into suitable conventional draw-forming dies D of a conventional press.

In the dies, the wires 10 are subjected, as a group, to a drawing operation by which portions 10a are initially drawn into a sinuous form to provide pin portions 10b joined by rounded crests 12 midway between the cross tie members 11.

Here it is to be noted that the word "sinuous" as used herein is used in a broad sense to describe a wire which is bent, drawn, gathered, or otherwise shaped so that lengthwise it extends to and fro across a longitudinal median line with alternate crests at opposite sides of the median line. It does not matter whether the crests are rounded, whether the wire is zig-zag in shape with regular apices, or truly sinusoidal, or whether the crests are lineal and extend at abrupt angles to the axes of the wire portions which they join, as, for example, in FIG. 9. The portions of the wire between alternate crests may be straight or curved.

The initial drawing of the portions 10a into the form of rounded crests 12 which are disposed at the opposite face of the mat from the tie bars 11 is by delayed action punches 13, carried in the dies D and operated while the formed portions of the wires 10 are gripped by the dies D.

The die D is provided with a holding portion 13a which, as the upper part of the die is lowered, moves to a position just clearing the top of the wire 10a. During this movement the wire 10a is drawn into the die by the punch 13 until the tie bar 11 engages, on its advancing lateral face, by the lateral face of the holding portion 13a, thus arresting further movement of the tie bar and wire 10a to the right in FIG. 8. The position of the portion 13a is chosen so that the length of the wire 10a to the right of the shoulder is not quite sufficient in length to form the two portions 10b and the lower rounded crest 12. As a result, as the punches 13 are lowered to final position, the length of the wire 10a engaged thereby between the two adjacent tie bars 11 is stretched slightly. This provides a distinct advantage in that it assures proper sizing of the resultant mat so that the distance between the opposite faces thereof is the same along the entire length and breadth of the mat. Any slight inaccuracies which in the length of wire between two adjacent ones of the tie bars 11 are thus removed inasmuch as the distance between two adjacent tie bars 11 is held constant in the dies and a slight drawing action is present in forming the lower crest 12. If two adjacent tie bars 11 happen to be slightly more than the required distance apart, the excess is not sufficient to eliminate entirely, but only to reduce, the amount of drawing required in forming the lower crest 12. Thus any additional length in the wire will be used up and dissipated without introducing any overall change in the face to face dimensional accuracy of the mat.

Next, upon release of the dies, the wires 10 are advanced endwise and pass into another portion of the dies in which the dies and punches 14 reform and thin the crests 12 so that each has a flat outer surface, as indicated at 12a, and a thickness less than the normal thickness of the wire stock. Each flat surface 12a is sufficiently large in area so that the area of contact between it and the confining plate will be at least two or more times as great as the cross sectional area of the pins 10a joined thereby. This latter die operation is a coining operation such that each of the faces 12a is substantially normal to the axes of the pins. The metal of the crests is squeezed and displaced laterally to the degree necessary to provide adequate contact area at 12a without undue thinning. The net result is substantially the same as though each pin 10a had its end disposed directly against the confining plate.

At the same time, the dies D engage the cross tie bars 11 at the opposite crests and round these crests and concurrently fix the overall dimension of the mat from the outer faces 12a to the outermost surfaces of the cross tie bars 11, rendering the surfaces 12a coplanar and the outermost surfaces of the tie bars coplanar and providing dimensional accuracy from face to face of the mat over the entire faces thereof.

This method is particularly desirable in the case where streamlined pins are required. In the forming of streamlined pins, in accordance with the method and apparatus of my United States Patent No. 2,678,808 of May 18, 1954, and No. 2,778,385 of January 22, 1957, great difficulty was encountered. In the case of the method and apparatus of my prior patents, wires of circular cross section were used, each wire, after being formed into shape, was additionally worked to impart to the resulting pins the streamlined cross section desired, a very difficult and expensive operation. However, the present method lends itself admirably to the formation of a mat comprised of streamlined pins. For example, in FIGS. 5 through 7, it is noted that the pin forming wires 10 are of lenticular or streamlined cross section. When such cross sections are used, the wires 10 are disposed with their major axes parallel to the faces of the assembled group while the wires are straight, and the cross tie bars 11 are then welded thereto. Thereafter, in the forming operation as illustrated in FIG. 8, the forming is done by the drawing and bending of the wires 10 as a group about axes parallel to the major axes of their cross sections, thus bending the wires 10 generally flatwise into sinusoidal shape.

It is to be noted that tie bars 11 are used only at one face of the mat. This is to render the mat slightly flexible so that it can conform readily to the confining plates. This facilitates brazing and assures more uniform results. Thus the pins of each wire are free to swing toward and away from those of adjacent wires upon flexure and bowing of the tie bars 11 in opposite directions, respectively, for they are not constrained at the face opposite the tie bars 11. On the other hand, the pins of each wire 10 are free to swing endwise of the wire by flexure of the ligaments or crests. This ability of the mat to flex about axes extending in the direction of both the length and the width of the mat provides the slight flexibility necessary. Thus the rigid beam effect of prior tie bar assemblies is eliminated. The mats, therefore, have enough yieldability to permit them to conform to slight irregularities in curvature or surface irregularities in their confining plates such as the walls 2, 3, and 4.

As best illustrated in FIGS. 1 and 4, the direction of flow is indicated by the arrows 17 and 18, the hotter fluids being indicated by the wavy arrows 17 and the cooler fluids being indicated by the solid arrows 18. It is to be noted that the flow of the gases is transversely of the wires 10, or parallel to the row of wires 10, and parallel to the length of the tie bars 11, so that the tie bars 11, even though heavy, do not obstruct the flow of gases but themselves assist in the conduction of heat from the pins 10a to the confining plates.

Thus, in the present method of forming the mats, the pin wires or members 10 are handled in assembled groups throughout the forming operations. They are passed through the dies step by step and the die operations are performed at each operation of the press on a large number of wires, concurrently. The resultant mats are dimensionally accurate between opposite faces and are sufficiently rigid to be handled readily, but have requisite flexibility flatwise for accommodating themselves to their confining plates under the weight of the assembled groups which form the finished heat exchanger.

The assembled mats are secured to the walls 2, 3 and 4 by brazing, as described in my United States Letters Patent No. 2,878,560, issued March 24, 1959, the assembly of mats and closure walls, side walls, and the like being brazed as a unit.

As shown in FIGS. 1 through 3, the periphery of the heat exchanger 1 is closed by suitable side walls, as indicated at 19, except at the location of the headers 20 and 21. The side walls are omitted at alternate ones of the spaces at the headers 20 and 21, respectively, so that the fluids can enter into the spaces 5 between the walls 2 through headers 20 and discharge at the opposite ends through the corresponding headers 20. The spaces 5 do not communicate with the headers 21. The headers 21 communicate only with the spaces 6 so that the fluids can flow from one to the other of the headers 21 through spaces 6 segregated from the fluids passing from one to the other of the headers 20. Thus the fluids in one set of spaces are at all times isolated from those in the other, and heat exchange takes place between the fluids through the plates or walls 2 and by conduction through the walls and pins.

The tie bars 11 may be of any desired cross sectional shape but should have a flattened side to bond against the walls 2 or confining plates to which they are to be secured. The thickness of the crests of the wires 10 opposite from the tie bars is about ⅓ the diameter of the pins. The bond between the crest surfaces 12a and the walls 2 and between the tie members 11 and the wires 10 are welded to provide permanent heat transfer bonds, the welding being effected to give good thermal bonds without thermal constrictions, and the areas of contact at the weld of each pin being at least equal to or greater than two times the cross sectional area of the particular pin.

By providing flat surfaces 12a, the wall surfaces at the junctures of the pins 10b and their confining wall 2 do not intersect at acute angles and form pockets which entrap foreign matter. Further, by using rounded crests at the junctures with the bars 11, with peaked tie bars, such pockets are greatly reduced. Instead, the walls at these locations intersect at such wide angles to each other that foreign matter cannot lodge easily and they can readily be swept by the air and gases passing through the exchanger to remove any sizeable foreign particles.

By the present method, the mats can readily be handled and even with large pins the dimensional accuracy between opposite faces of the mat can be kept within very narrow limits, all pins being of identical length. A particular advantage is the fact that the wires to form the pins can be pre-rolled to a streamlined shape prior to forming into pin fins.

The term "wire," as used herein, includes not only the conventional wires of the cross sectional areas and shapes commonly referred to as wire, but also bar, band, and rod stock of like or greater cross sectional areas. The shape of the cross sections, regardless of area, may be circular, lenticular, approximately rectangular, streamlined, or any other shape suitable for pins of heat exchangers.

Having thus described my invention, I claim:

1. The method of making a pin fin assemblage and comprising arranging a plurality of straight pin wires in a group in a row in laterally spaced parallel relation, welding thereto at spaced intervals along the length of the pin wires, at one face of the group, cross tie members having flat outer surfaces facing outwardly from said one face, to form an assemblage, forming the pin wires of the assemblage concurrently into sinuous shape progressively, endwise of the wires, from one edge of the assemblage toward the opposite edge, each wire with its alternate crest at opposite faces of the assemblage, respectively, and with the crests at each face arranged in rows, the crests of each row being aligned transversely of the lengths of the pin wires and parallel to the cross members, and with the relatively heavy cross tie members disposed at the outside of the crests at said one face of the group, progressively die pressure forming the crests at the other face of the group endwise of the wires to provide outer flat coplanar outer faces for bonding to a metal plate, and, during said pressure forming, concurrently rendering the spacing of the plane of the outer surfaces of the cross tie members and the plane of the flat coplanar faces dimensionally accurate for the entire group, said first forming being by die drawing and the finish forming being by die coining, and each portion drawn in one die drawing operation being thereafter coined while the next succeeding portion is being drawn by the die drawing operation.

2. The method of making a pin fin assemblage and comprising arranging a plurality of straight pin wires in a group in a row in laterally spaced parallel relation, welding thereto at spaced intervals along the length of the pin wires, at one face of the group, cross tie members having flat outer surfaces facing outwardly from said one face, to form an assemblage, forming the pin wires of the assemblage concurrently with sinuous shape progressively, endwise of the wires, from one edge of the assemblage toward the opposite edge, each wire with its alternate crest at opposite faces of the assemblage, respectively, and with the crests at each face arranged in rows, the crests of each row being aligned transversely of the lengths of the pin wires and parallel to the cross members, and with the relatively heavy cross tie members disposed at the outside of the crests at said one face of the group, progressively die pressure forming the crests at the other face of the group, endwise of the wires, to provide outer flat coplanar outer faces for bonding to a metal plate, and, during said pressure forming, concurrently rendering the spacing of the plane of the outer surfaces of the cross tie members and the plane of the flat coplanar faces dimensionally accurate for the entire group, and said welding being so performed that each welded area of contact between each cross bar and each pin wire it intersects is at least twice as great as the cross sectional area of the wire adjacent to the joint, and the forming of each crest at the other face of the group is such that the area of each flat coplanar outer face for bonding to a metal plate is at least twice as great as the cross sectional area of the wire adjacent to that particular outer face, whereby heat flow from the pins to the outer faces of their associated cross bars and to their flat coplanar outer faces is free from thermal constriction.

References Cited in the file of this patent

UNITED STATES PATENTS

| | | |
|---|---|---|
| 1,513,032 | Bull | Oct. 28, 1924 |
| 2,413,179 | Grandmont | Dec. 24, 1946 |
| 2,678,808 | Gier | May 18, 1954 |
| 2,722,048 | Gier | Nov. 1, 1955 |
| 2,734,259 | Beck | Feb. 14, 1956 |
| 2,814,470 | Peterson | Nov. 26, 1957 |
| 2,868,236 | Smith | Jan. 13, 1959 |
| 2,869,222 | Whistle | Jan. 20, 1959 |
| 2,892,618 | Holm | June 30, 1959 |

FOREIGN PATENTS

| | | |
|---|---|---|
| 484,636 | Canada | July 8, 1952 |